United States Patent
Hogan et al.

(10) Patent No.: US 12,530,892 B2
(45) Date of Patent: Jan. 20, 2026

(54) SYSTEMS AND METHODS OF AUTOMATICALLY PERFORMING VIDEO ANALYSIS USING PREDICTED FUTURE EVENTS

(71) Applicant: Toshiba Global Commerce Solutions, Inc., Durham, NC (US)

(72) Inventors: Patricia S. Hogan, Raleigh, NC (US); Susan W. Brosnan, Raleigh, NC (US); Jessica K. Snead, Cary, NC (US); Daniel R. Goins, Wake Forest, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 396 days.

(21) Appl. No.: 17/486,193

(22) Filed: Sep. 27, 2021

(65) Prior Publication Data

US 2023/0106210 A1  Apr. 6, 2023

(51) Int. Cl.
*G06V 20/40* (2022.01)
*G06F 16/783* (2019.01)
(Continued)

(52) U.S. Cl.
CPC .......... *G06V 20/46* (2022.01); *G06F 16/7834* (2019.01); *G06F 16/7837* (2019.01);
(Continued)

(58) Field of Classification Search
CPC .... G06V 20/46; G06V 20/44; G06V 10/7788; G06V 20/52; G06F 16/7834; G06F 16/7837; G06N 3/08; G06T 7/246
(Continued)

(56) References Cited

U.S. PATENT DOCUMENTS

| | | | |
|---|---|---|---|
| 8,462,212 B1 * | 6/2013 | Kundu | G07G 1/0081 348/150 |
| 8,538,820 B1 * | 9/2013 | Migdal | G07G 1/0054 705/16 |

(Continued)

OTHER PUBLICATIONS

Movie, "Add comment markers and chapter markers," <http://imovie.skydocu.com/en/organize-video/rate-and-tag-video/add-comment-markers-and-chapter-markers/> web page publicly available at least as early as Apr. 9, 2021.

(Continued)

*Primary Examiner* — Jennifer Mehmood
*Assistant Examiner* — Heath E. Wells
(74) *Attorney, Agent, or Firm* — Kaufman & Canoles P.C.

(57) ABSTRACT

Systems and methods of performing video analysis related to a video of an electronic terminal. In one exemplary embodiment, a method is performed by an electronic device that includes processing circuitry. The method may include causing a display to play a video that shows an electronic terminal, automatically detecting a captured event related to the electronic terminal in the video, capturing first time stamp information corresponding to a time point in the video that the captured event occurs in the video, and predicting a future event associated with the captured event related to the electronic terminal in the video. The method may also include capturing and outputting second time stamp information corresponding to a time point in the video that the predicted future event is detected to have occurred in the video.

21 Claims, 4 Drawing Sheets

(51) Int. Cl.
*G06N 3/08* (2023.01)
*G06T 7/246* (2017.01)

(52) U.S. Cl.
CPC ............. *G06N 3/08* (2013.01); *G06T 7/246* (2017.01); *G06V 20/44* (2022.01)

(58) Field of Classification Search
USPC ........................................... 382/103
See application file for complete search history.

(56) References Cited

U.S. PATENT DOCUMENTS

| | | | | |
|---|---|---|---|---|
| 10,796,305 | B1* | 10/2020 | Farrow | G06Q 20/202 |
| 2010/0059589 | A1* | 3/2010 | Goncalves | G07G 1/0054 |
| | | | | 382/218 |
| 2014/0376876 | A1* | 12/2014 | Bentley | G06V 40/23 |
| | | | | 386/227 |
| 2015/0317801 | A1* | 11/2015 | Bentley | G08B 21/043 |
| | | | | 382/107 |
| 2018/0084227 | A1* | 3/2018 | Migdal | G08B 13/19682 |
| 2020/0327444 | A1* | 10/2020 | Negi | G06Q 30/0281 |
| 2020/0364999 | A1* | 11/2020 | Mullins | G08B 13/19645 |
| 2021/0133456 | A1* | 5/2021 | Lee | G06F 18/21 |
| 2021/0397847 | A1* | 12/2021 | Jayaram | H04N 21/21805 |
| 2022/0319181 | A1* | 10/2022 | Kanuganti | G09B 7/02 |

OTHER PUBLICATIONS

Goreact, "Critiquing videos," <https://help.goreact.com/hc/en-us/articles/360003084771-Crit> web page publicly available at least as early as Apr. 9, 2021.

Jimenez, "Event Detection in Surveillance Video," College of Engineering and Computer Science Florida Atlantic University, dated May 2010.

March Networks, "ME6 Series IP Cameras," <https://www.marchnetworks.com/security-cameras-with-ai-analytics/> web page publicly available at least as early as Apr. 9, 2021.

Ellingsen, "Salient event-detection in video surveillance scenarios," AREA '08: Proceedings of the 1st ACM workshop on Analysis and retrieval of events/actions and workflows in video streams, Oct. 2008, pp. 57-64.

Vieri Technologies, "Camera Stopwatch Lite," <https://play.google.com/store/apps/details?id=com.vieritechnologies.camerastopwatch&hl=en_US> web page publicly available at least as early as Apr. 9, 2021.

* cited by examiner

SYSTEMS AND METHODS OF AUTOMATICALLY PERFORMING VIDEO ANALYSIS USING PREDICTED FUTURE EVENTS

BACKGROUND

Conventional video learning algorithms have not been applied to automatically analyze video to record timing points with regards to an electronic terminal (e.g., to get response times of the hardware). For example, to measure the response time (e.g., duration, amount of time) a user experiences using a software product, a video may be recorded of the user using the software product. The video is then analyzed frame by frame to see how long the user took to respond to a prompt, and if they could not find the button to press, or kept miss hitting the button, or the button did not detect their touch, then manual frame analysis is used to detect from when the user hit the button until the screen changed. Currently this is a very manual process (i.e., labor intensive, many man/woman-hours). Accordingly, there is a need for improved techniques for performing video analysis for recording timing points with regards to hardware.

SUMMARY

The following presents a simplified summary of the present disclosure in order to provide a basic understanding to those of skill in the art. This summary is not an extensive overview of the present disclosure and is not intended to identify key/critical elements of embodiments of the present disclosure or to delineate the scope of the disclosure. The sole purpose of this summary is to present some concepts disclosed herein in a simplified form as a prelude to the more detailed description that is presented later.

Briefly described, embodiments of the present disclosure relate to systems and methods of conducting a video analysis and event measurement using processing circuitry. The method may include: causing, by processing circuitry, a display to play a video that shows an electronic terminal, and while the video is playing on the display: performing a number of operations. For example, the operations may include: automatically detecting, by the processing circuitry, a captured event related to the electronic terminal in the video; capturing, by the processing circuitry, first time stamp information corresponding to a time point in the video that the captured event occurs in the video; predicting, by the processing circuitry, a future event associated with the captured event related to the electronic terminal in the video; responsive to the predicted future event occurring, capturing, by the processing circuitry, second time stamp information corresponding to a time point in the video that the predicted future event is detected to have occurred in the video; and outputting, by the processing circuitry, information related to the predicted future event, and the captured second time stamp information to a file.

The operations may further include: causing, by the processing circuitry, the display to display the video playing with information regarding the predicted future event superimposed on the video that is playing. The displayed superimposed information includes an annotation regarding the predicted future event. The displayed superimposed information includes a list of annotations, including at least one annotation regarding the predicted future event. The displayed list of annotations includes toggleable check boxes to allow a user to indicate whether a predicted future event should be recorded.

The operations may further include: calculating an amount of time between the captured event and the predicted future event after the predicted future event occurs; and storing in the file or causing the display to display the calculated amount of time.

The operations may further include identifying a profile associated with a type of the video, wherein the predicting of the future event associated with the captured event includes predicting a future event based on event sequence or event procedure information stored in the identified profile.

The identifying of the profile associated with the type of the video includes automatically recognizing the type of the video based on object detection or audible recognition, or via manual entry by a user that indicates the type of the profile, from among a set of stored profile types. The automatic detecting of the predicted future event includes at least one of: performing object detection and identification on at least a portion of the video, or recognizing a sound in the video.

The outputting, by the processing circuitry, includes outputting text corresponding to an annotation for the predicted future event with the outputting of the second time stamp information. The suggested annotation for the predicted future event corresponds to an event type of the predicted future event.

The predicted future event includes at least one of: displaying a predetermined message by a display screen of or connected to the electronic terminal, displaying a color by a display indicator of or connected to the electronic terminal, a peripheral device performing an action, or an output of a sound.

The predicted future event is predicted based on an output from a neural network trained using previous video sequence or video procedures that include annotations corresponding to a series of events associated with electronic terminal types. The trained neural network is trained based on at least one previously-viewed video and raw data that includes annotations of event types of profiles corresponding to different types of electronic terminals, wherein the at least one previously-viewed video includes imagery of a same procedure or event sequence type as the video related to the electronic terminal that is playing. The raw data used to train the neural network includes time stamp information with regards to timepoints of the event types of the profiles.

According to various embodiments, a video analysis system may include processing circuitry and a memory. The memory containing instructions executable by the processing circuitry that causes the processing circuitry to: cause a display to play a video that shows an electronic terminal; and while the video is playing on the display: automatically detect a captured event related to the electronic terminal in the video; capture first time stamp information corresponding to a time point in the video that the captured event occurs in the video; predict a future event associated with the captured event related to the electronic terminal in the video; responsive to the predicted future event occurring, capture second time stamp information corresponding to a time point in the video that the predicted future event is detected to have occurred in the video; and output information related to the predicted future event, and the captured second time stamp information to a file.

The instructions further cause the processing circuitry to: cause the display to display the video playing with information regarding the predicted future event superimposed on the video that is playing. The instructions further cause the processing circuitry to: identifying a profile associated with a type of the video, wherein the predicting of the future event associated with the captured event includes predicting a future event based on event sequence or event procedure information stored in the identified profile.

According to various embodiments, a non-transitory computer readable medium stores computer-executable instructions that, when executed by processing circuitry, cause the processing circuitry to: cause a display to play a video that shows an electronic terminal; and while the video is playing on the display: automatically detect a captured event related to the electronic terminal in the video; capture first time stamp information corresponding to a time point in the video that the captured event occurs in the video; predict a future event associated with the captured event related to the electronic terminal in the video; responsive to the predicted future event occurring, capture second time stamp information corresponding to a time point in the video that the predicted future event is detected to have occurred in the video; and output information related to the predicted future event, and the captured second time stamp information to a file.

The computer-executable instructions are further configured to: cause the display to display the video playing with information regarding the predicted future event superimposed on the video that is playing.

BRIEF DESCRIPTION OF THE DRAWINGS

The present disclosure will now be described more fully hereinafter with reference to the accompanying drawings, in which embodiments of the present disclosure are shown. However, the present disclosure should not be construed as limited to the embodiments set forth herein. Rather, these embodiments are provided so that the present disclosure will be thorough and complete, and will fully convey the scope of the present disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous details are set forth in order to provide a thorough understanding of the present disclosure. However, it will be readily apparent to one of ordinary skill in the art that the present disclosure may be practiced without limitation to these details.

Figure 1:
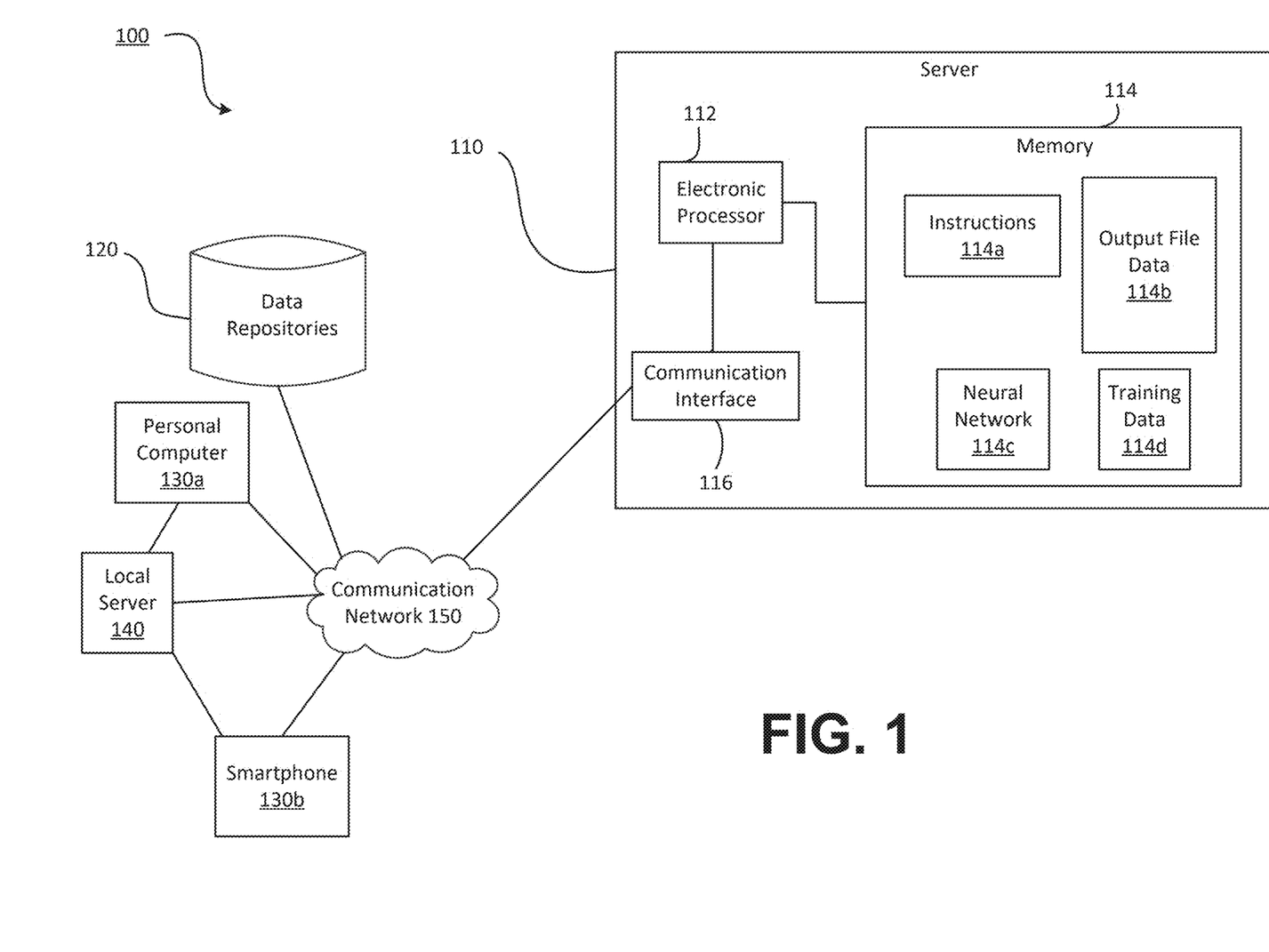
FIG. 1 illustrates one embodiment of a system in accordance with various aspects as described herein.

In the present disclosure, systems and methods of conducting a video analysis and event measurement using processing circuitry of one of the above-described or below described electronic devices. In one example, FIG. 1 illustrates a networked computer system 100 for performing the method 400 disclosed herein. The networked computer system 100 includes a server 110 having processing circuitry, including one or more of an electronic processor 112, a memory 114 and a communication interface 116.

The server 110 communicates with the data repositories 120 over one or more wired or wireless communication networks 150. Portions of the wireless communication networks 150 may be implemented using a wide area network (WAN), such as the Internet, a local area network (LAN), such as a Bluetooth™ network or Wi-Fi™, and combinations or derivatives thereof. The system 100 may include more or fewer servers and the server 110, the local server 140 and the repositories 120 illustrated in FIG. 1 are purely for illustrative purposes. For example, in some embodiments, the functionality described herein as being performed by the server 110 is performed via a set of servers in a distributed or cloud-computing environment. Also, in some embodiments, the data repositories 120 may be combined with the server 110 or may communicate with the server 110 over a dedicated communication channel (as compared to a network). Also, in some embodiments, the components illustrated in system 100 may communicate through one or more intermediary devices not illustrated in FIG. 1. Moreover, processing (i.e., the server processing) may be performed locally, such as on a local server or on the local device.

The electronic processor 112, the memory 114, and the communication interface 116 communicate wirelessly, over wired communication channels or buses, or a combination thereof. The server 110 may include additional components than those illustrated in FIG. 1 in various configurations. For example, in some embodiments, the server 110 includes multiple electronic processors, multiple memory modules, multiple communication interfaces, or a combination thereof. Also, as noted above, the functionality described herein as being performed by the server 110 may be performed in a distributed nature by a set of computers or servers located in various geographic locations.

The electronic processor 112 may be, for example, a microprocessor, an application-specific integrated circuit (ASIC), or another suitable central processing unit (CPU). The electronic processor 112 is generally configured to execute software instructions to perform a set of functions, including the functions/operations described herein. The memory 114 includes a non-transitory computer-readable medium, such as random access memory (RAM), read-only memory (ROM), or the like. The memory 114 stores data, including instructions executable by the electronic processor 112. The communication interface 116 communicates with the other electronic devices external to the server 110. For example, the communication interface may include a wired or wireless transceiver or port, for communicating over the communication networks 150 and, optionally, one or more additional communication networks or connections.

As illustrated in FIG. 1, the memory 114 of the server 110 stores automated instructions 114a (e.g., instructions for performing the method 400 discussed below), output file data 114b, and a neural network 114c. In one example, the instructions 114a includes the operations/blocks of method 400, which is discussed in more detail below. The neural network 114c is used for machine learning and the training set 114d may be used to train the neural network as described herein. In one example, the neural network may be used to update the parameters (e.g., thresholds, percentages). However, additional neural networks may be also stored in the memory.

The server 110 is configured to perform the method 400 by way of the instructions 114a. Although the functionality of the system 100 is described as being performed by the server 110 (by way of 114*a*-114*c*), according to one or more embodiments, a local server 140, which communicates with a personal computer 130*a* or smartphone 130*b*, may perform the methods described herein by downloading the functionality from the (main) server 110. Similarly, the functionality may be performed by the smartphone or personal computer.

In one example, the neural network 114*c* is used for machine learning and the training set 114*d* (e.g., the raw data described below) may be used to train the neural network as described herein.

A set of hardware and software-based devices, as well as a set of different structural components may be utilized to implement the embodiments described herein. In addition, embodiments may include hardware, software, and electronic components or modules that, for purposes of discussion, may be illustrated and described as if the majority of the components were implemented solely in hardware. One of ordinary skill in the art, and based on a reading of this detailed description, would recognize that, in at least one embodiment, the electronic-based aspects of the embodiments may be implemented in software (e.g., stored on non-transitory computer-readable medium) executable by one or more processors. As such, it should be noted that a set of hardware and software-based devices, as well as a set of different structural components, may be utilized to implement the embodiments. For example, "mobile device," "smartphone," "electronic device," "computing device," and "server" as described in the specification may include one or more electronic processors, one or more memory modules including non-transitory computer-readable media, one or more input/output interfaces, and various connections (e.g., a system bus) connecting the components.

While exemplary systems are shown in the Figures, the exemplary components illustrated in the Figures are not intended to be limiting. Indeed, additional or alternative components and/or implementations may be used.

Figure 2:
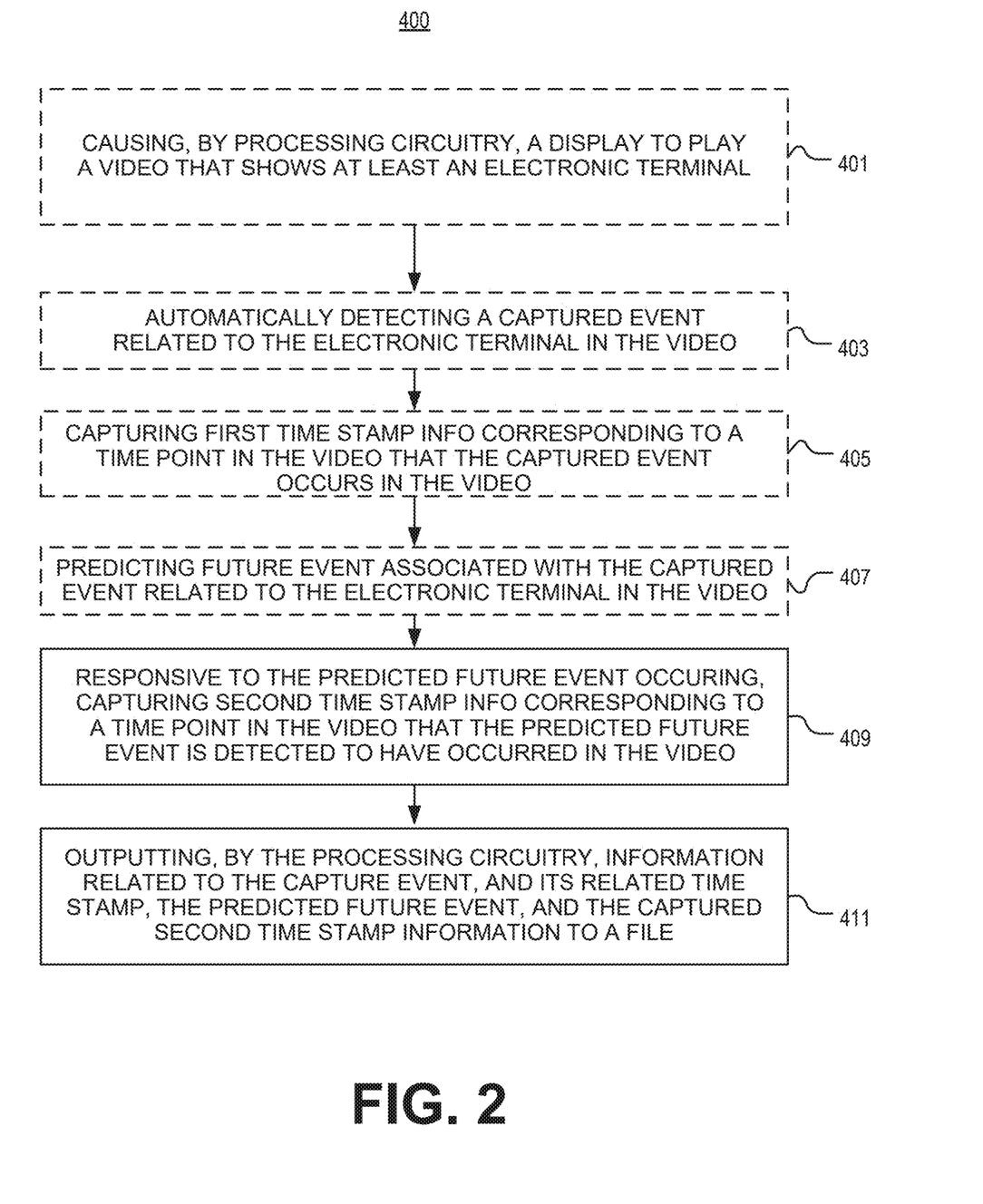
FIG. 2 illustrates one embodiment of a method 400 of conducting a video analysis and event measurement using processing circuitry in accordance with various aspects as described herein.

FIG. 2 illustrates one embodiment of a method 400 of conducting a video analysis and event measurement using processing circuitry of one of the above-described or below described electronic devices in accordance with various aspects as described herein. In FIG. 4, the method 400 may start, for instance, at block 401 where it may include causing, by processing circuitry, a display to play a video that shows an electronic terminal. In the present disclosure, the video showing the electronic terminal may include a video that shows one or more of: a portion of an electronic terminal, or one or more electronic devices or peripherals connected (wired or wirelessly) to the electronic terminal, such as a monitor (e.g., a touch screen display monitor), a keyboard, a mouse, a PIN pad, a card reader, a short-range communications device, such as a Bluetooth or near-field communication (NFC) device, a paper receipt printer, or another suitable peripheral device. Block 401 may be preceded by a step of receiving or accessing, by the processing circuitry, the video from a memory or from another device. At block 403, the method 400 may include automatically detecting, by the processing circuitry, a captured event related to the electronic terminal in the video. At block 405, the method 400 may include capturing, by the processing circuitry, first time stamp information corresponding to a time point in the video that the captured event occurs in the video. At block 407, the method 400 may include predicting, by the processing circuitry, a future event associated with the captured event related to the electronic terminal in the video. In response to the predicted future event occurring (e.g., via video or audio detection of the predicted future event), the method 400 may include capturing, by the processing circuitry, second time stamp information corresponding to a time point in the video that the predicted future event is detected to have occurred in the video, as represented by block 409. At block 411, the method 400 may include outputting, by the processing circuitry, information related to the captured event, and its related time stamp, the predicted future event, and the captured second time stamp information to a file. One or more of Blocks 403, 405, 407, 409 and 411 may occur while the video is playing (e.g., during playback mode of the video).

The method 400 may further include causing, by the processing circuitry, the display to display the video playing with information regarding the predicted future event superimposed on the video that is playing. In one example, the display of the superimposed information could be prior to the predicted future event occurring. The displayed superimposed information may include an annotation regarding the predicted future event. The displayed superimposed information may include a list of annotations, including at least one annotation regarding the predicted future event. The displayed list of annotations may include toggleable check boxes to allow a user to indicate whether a predicted future event should be recorded.

The method 400 may further include calculating an amount of time between the captured event and the predicted future event after the predicted future event occurs, and storing in the file (e.g., of a memory) or causing the display to display the calculated amount of time. For example, the method 400 may further include automatically calculating an amount of time or duration between event 1 and event 2. In another example, the key events may have intermediary events (e.g., calculating three events 1, 2 and 3, and the duration is measured between Event 1 and Event 3). The superimposed information may include display a portion or all of the log of events (the recorded annotations with or without the time stamps), a report/summary of the log of events (e.g., the fastest events, such as device type profiles having the fastest events). For example, the report summary could provide analytics, such as "99 times out of 100 this device type profile took 2.2 seconds or less for" a type of event transition. The superimposed information may also provide the ability for a user to check/uncheck predicted future events to indicate whether the predicted future events are to be saved/stored. That is, the superimposed future events may be suggested/recommended future events.

The method 400 may further comprise identifying a profile associated with a type of the video, wherein the predicting of the future event associated with the captured event includes predicting a future event based on event sequence or event procedure information stored in the identified profile. The time stamp information associated with the events may be used to generate the event sequence or event procedure information. The identifying of the profile associated with the type of the video may include automatically recognizing the type of the video based on object detection or audible recognition, or via manual entry by a user that indicates the type of the profile, from among a set of stored profile types. The automatic detecting of the predicted future event may include at least one of: performing object detection and identification on at least a portion of the video, or recognizing a sound in the video.

The outputting, by the processing circuitry, may include outputting text corresponding to an annotation for the predicted future event with the outputting of the second time stamp information. The suggested annotation for the predicted future event may correspond to an event type of the predicted future event. The predicted future event may include at least one of: displaying a predetermined message by a display screen of or connected to the electronic terminal, displaying a color by a display indicator of or connected to the electronic terminal, a peripheral device performing an action, or an output of a sound.

The predetermined message may include displaying "insert, tap or slide payment" prompt or a similar suitable prompt, displaying "remove card" prompt, displaying "yes/no" or "ok?" prompt, displaying "enter pin" prompt, displaying transaction approved message. The predetermined action may include, for example, starting of printing of a paper receipt, or a different stage of printing of a paper receipt (e.g., completion of printing).

The predicted future event may be predicted based on an output from a neural network trained using previous video sequence or video procedures that include annotations corresponding to a series of events associated with electronic terminal types. These may each be accessed based on a profile (e.g., a device type profile, such as a debit card reader profile, a credit card reader profile, or a type of debit card reader profile, or a service desk profile, or a self-service checkout lane, etc.). The profiles may include annotations corresponding to respective previous time points of respective previous actions related to the profiled procedure. The trained neural network may train based on raw data that includes videos and annotations of event types of profiles corresponding to different types of electronic terminals. The raw data used to train the neural network includes time stamp information with regards to timepoints of the event types of the profiles.

The raw data may be in the form of a video and an associated file (e.g., a Microsoft Excel (XLS) or extensible markup language (XML) file, but other file formats may be used). The neural network may be trained to learn what events are next (e.g., next in a sequence of events that define a procedure). The profiles may be saved in a memory. The automatically detected event may correspond to a payment device or payment card being inserted into, slid through or tapped on a portion of an electronic reader of the electronic payment terminal. The automatically detected event may correspond to a user's finger touching a button on the electronic terminal's video display and the button color changing to indicate the button was touched. The automatically detected event may correspond to the audio beep of a scanner when the scanner scans a barcode. The touched button may be a hard key button or a displayed button on a graphical user interface (GUI) of a touch screen display that displays the video.

To measure the response time (e.g., duration, amount of time) a user experiences using a software product, often a video is recorded of the user using the software product. The video is than analyzed frame by frame to see how long the user took to respond to a prompt, and if they could not find the button to press, or kept miss hitting the button, or the button did not detect their touch, then frame analysis is used to detect from when the user hit the button until the screen changed. Currently, this is a very manual (labor intensive) process. The methods of the present disclosure provide two functions. First, have the person analyzing the video be able to mark a frame as a significant timing point, and be able to annotate the frame to describe what is happening at that point of time, e.g., one or more of "User touched Single Tender Key", "User touched the Confirm button for the tender amount", "User touched Enter after typing in their PIN on the PIN Pad". The time stamp of the video frame and the annotation of what is in the frame would be written to an output file that can be used later for analysis. The output file along with the corresponding video also could be used as the raw data to train the neural network. Second, the video editing tool would learn over time how to recognize significant timing frames/events in the video and would automatically mark, record, and annotate the video frames associated with the identified events. In one example, when the person analyzing a video of a set of steps or sequences (e.g., Insert Credit Card displayed on display screen after Single Tender Key selected/touched) has watched one video, marked, and annotated the significant events, the editor would have learned those events, and when a second video of another Insert Credit Card after Single Tender Key was brought up, the editing tool would use what it had learned from the first video to find all the timing points (significant events) in the subsequent videos and write their time stamps and descriptions out to a file. In an embodiment, the operation of Insert Credit Card may correspond to the displaying of the Insert Credit Card message/prompt on a display screen. In on example, the displaying of the Insert Cred Card message/prompt may be followed by a detectable event of a user inserting the credit card into a PIN pad (e.g., detectable by video recognition or sound detection of, for example, a beep). The output files could be used for comparing timings between similar videos (e.g., having the same electronic terminal type profile).

In one example, technical advantages of the present disclosure provide automation of a previously manually performed process, which increases efficiency of the existing technology (e.g., the technology related to evaluating response times of electronic terminals, such as POS terminals). The technical advantages include increased efficiency, less manual labor (data entry) required, and an accuracy enhancement. The more videos the video analysis tool (e.g., method 400) saw the better it would be at finding the timing points, even to the point it might be able to suggest timing points if a slightly different sequence of steps video was being analyzed e.g. Insert Debit Card after Single Tender key. The system, via the video analysis tool, enables the user to annotate new timing points, e.g., PIN Pad shows the Select Cashback screen. In another example, profiles of different types of video are stored in memory (e.g. Insert Credit card videos, Insert Debit Card videos, user sign-on videos), retrieve 30-item transaction videos, and segment and identify objects of interest in the video based on the stored profiles. The video analysis tool is extended to learn from the output file of annotated video time stamps, the user wants to know the elapsed time from, for example, time stamp 1 with annotation "Card Inserted" to time stamp 2 with the annotation "PIN Pad shows the "Processing Please wait" message". As another example, or in conjunction with the first example, time stamp 2 with annotation "PIN Pad shows the "Processing Please wait" message" to time stamp 3 with annotation "PIN Pad shows the "Please remove card" message."

The video analysis tool would automatically calculate response times and write them out to the output file along with their description. The video analysis tool would be able to compare two or more similar videos and show a table of the different response times for each video.

Conventional video learning algorithms have not been applied to automatically analyze video to get response times and record them and the timing points, or to compare response times and timing points between similar videos. The present disclosure may be used on self-service check-outs (e.g., at grocery stores) or electronic payment terminals to, for example, check response times for sign-on, sign-off, scanning items (e.g., 30 items) as fast as possible, suspend transaction, retrieve transaction and see how fast the number of items (e.g., 30 items) and the total cost are updated on the screen. In another example, the present disclosure calculates how fast the display monitor/screen transitions when the devices are connected locally or in at least one communication network. The present disclosure improves response time processing efficiency, as well as video analysis.

Instead of time stamp information, frame identification information (e.g., frame numbers) may be used. However, the time stamp information may be used to identify the frame (e.g., 6:02 may correspond to the frame at 6:02).

The determination of a profile/profiled procedure associated with the type of video (e.g., a video of a type of electronic terminal) may include accessing information regarding predicted future events based on the profile/profiled procedure, such as by using the neural network.

In an embodiment of the present disclosure, the system, by way of the tool, automates a logging process of recording events in the video and the time stamps of those events, which are used to measure response times with relation to the key events (this could be a sequence of three events). The conventional approach required a user to manually observe the events related to the user terminal and perform data entry (e.g., entering the key events, and timing of the key events into a spreadsheet) for each significant event. Manual logging processes are manually intensive, and inefficient. Automating, in accordance with the present disclosure, improves the efficiency of the process of recording/logging the important (significant or key) events in the video and the time stamps of those events, and also the efficiency of calculating the response times. For instance, the manual process may include a person watching a video of a sequence of events or procedures, and manually logging those events. In some examples, the sequence of events/procedure include "payment" transactions and "Point of Sale" transactions. For illustration purposes, payment and point of sale transactions are used to describe a known or predictable sequence of events/actions that occur during a procedure. The present disclosure is not limited to the payment/point of sale arena. The present disclosure includes adding code/machine learning/video analytics to the video analysis tool to make the video analysis tool more useful (e.g., by automating a process that is performed manually in the related technology). In addition, the system, by way of the tool, is more accurate (e.g., with regards to precise timing of the time stamp of when the event occurred) compared to the conventional approach (based on human observation), and have less errors compared to human error. Initially, the person watching the video in the video analysis tool will identify, to the tool, the name of the procedure displayed in the video. The person watching the video in the video analysis tool will manually stop the video on certain frames of interest and mark the time in the video and annotate that time point to say what is happening, e.g. Touched "Pay Now" button on self-checkout display, Scan coupons screen is displayed, Touched "Continue" button, Tender button palette is displayed, Touched "Credit", Prompt to follow instructions on the PIN pad is displayed or heard. These time stamps and their annotation are written to an output file. The output file, name of the procedure in the video and the video are associated in a profile.

Over time the video analysis tool will add to the profile for the procedure, a list of objects, actions, events, event annotations and event sequences the video tool has learned should be associated with that type of procedure. When the video tool is instructed to analyze a different video for the same procedure, it will use the data in the profile to pick out the appropriate objects, actions and events in the new video. Using that information, it will automate the analysis of the new video of the procedure.

The machine learning (neural network) in the video analysis would learn to recognize objects/events it captures or detects in the videos, e.g. Audio beep for item scanned, Audio blip of payment card tapped on PIN pad, Audio noise of receipt printer starts printing, Audio noise of paper receipt paper cut, Audio noise of keypad button depressed (tap noise), Audio noise of PIN Pad chiming to alert user to remove their payment card, Audio noise of cash drawer popping open, Audio noise of cast drawer being closed, Video display screen, Buttons displayed on the video display screen, Pictures shown on the video display screen, Totals area on the video display screen, Tax area on the video display screen, Scale weight area on the video display screen, Scrolling receipt area of the video display screen, New line added to the scrolling receipt area on the video display screen, Item description in the line of the scrolling receipt, Item price in the item description line of the scrolling receipt, 2×20 message area on the video display screen, Message displayed in the 2×20 area of the video display screen, Popup screen on the video display, Buttons on the popup screen, Finger touches button and button changes color, PIN Pad, Keypad of PIN Pad, Touch Display of PIN Pad, Messages/sequence of messages on touch display of PIN Pad, home screen, "Insert, Swipe or Tap Card" screen, "Processing please wait", "Enter zip code", "Amount OK", "Cash Back", "Do not remove card", "Approved", "Remove Card", "Thank You", "Closed", "Please wait for cashier", "French, Spanish or English", "Checking or Saving account", "Enter PIN", Magnetic Strip reader of PIN Pad (where user slides the card), Place where user inserts payment card into PIN Pad that the user running the video analysis tool tends to stop and focus on certain thing, Receipt printer, Physical 2×20 display, Green or red flash of scanner, Shopper's hand, Shopper or associates fingers tapping buttons, button on video display changed color when button touched, Hand held scanner, Scanner scale, Etc. The list provided here is not exhaustive.

The objects/events that are recognized may be recognized based on visual or audible objects/events. For example, the visual objects/events may be detected using objection detection or recognition, or gesture recognition. The audible objects/events may be detected by performing noise type recognition, or speech recognition. The list above provides examples for Point of Sale activities/sequences/events. In some examples the video analytics could learn events in sequences/procedures from other settings as a user manually stops and annotates video frames, and over time the system will learn what events are interesting for that setting. The video analysis user could load a profile to the video analysis tool indicating what type of procedure is in the video, and that would guide the video analysis tool on what type of audio (beeps) to look for, what type of objects (receipt printer, operator video display, PIN Pad, scanner, . . . ) and what type of events to search for (button touch, screen change, PIN pad screen message, receipt starts printing, receipt stops printing, cash drawer springs open). In some examples, the procedure represents a person driving a car around a parking lot looking for a parking space shoppers in a retail environment getting into the store with phone tap or palm print read, then where they go in the store and what they pick up and when they walk out, watching associates and how they stock shelves, or watching an industrial manufacturing process.

The method may be linked to a procedure associated with a profile. The profile has information about procedures, events, items or objects the video analysis should recognize, based on what a user watching the first video of that same type of procedure manually identified as objects and events of interest in that profile's sequence of events. The present disclosure is based on a user manually selecting video frames, and the video analysis tool learns what is interesting in that frame, and learns the associated annotation (e.g., an annotation of: Touched "Pay Now" button). The next time a video is fed to the video analysis tool, and the profile is, for example, "GroceryStore_X Refunds Application", "TCx Pay PIN Pad procedure", the tool will identify and detect the interesting events in the video automatically based on what it learned and the tool will write out the time stamp of the event and the associated annotation.

The video analysis tool could be used to watch any video of a sequence of actions/events that form a procedure. The tool learns the procedure and has an associated profile for the procedure. The profile indicates what objects, events and actions are relevant to the procedure. For example, for a video of a point of sale payment transaction using a form of electronic payment, the profile for the procedure might list all the points of interest for the video analysis. The points of interest may include one or more of the objects/events the neural networks sees/hears frequently in the videos as described above. These objects/events that are learned may initially be based on user interaction with and/or annotations regarding a video of a same type (e.g., same retail store or store type, same type of electronic terminal in the video).

In another example, the present disclosure is related to the ability to learn a profile for a procedure/sequence of events, load that profile for another video of that procedure, have the video analytics watch the video and pick out the significant events and time stamps and their matching annotation. Although the video analytics may "watch" the video, according to various embodiments, the video may be played on a display device, or it may not be displayed/played on a display device while the video analytics (e.g., voice/object recognition/detection) is performed.

In one example, the video analysis automatically recognizes when significant events occur and learns over time which events are related. The video analytics may capture a desired procedure (e.g., the timing from event 1 (Touch "Pay Now") until event 2 (Scan Coupons screen), the timing from event C (touch exact change) to event F (receipt starts printing)), and may summarize the timings. According to an embodiment, the tool identifies the response times in the video and determines if the response time meets the expected response time (e.g., is less than the expected response time, which may be based on a user entry of expected response time(s) or an average or median of real timings).

Figure 3:
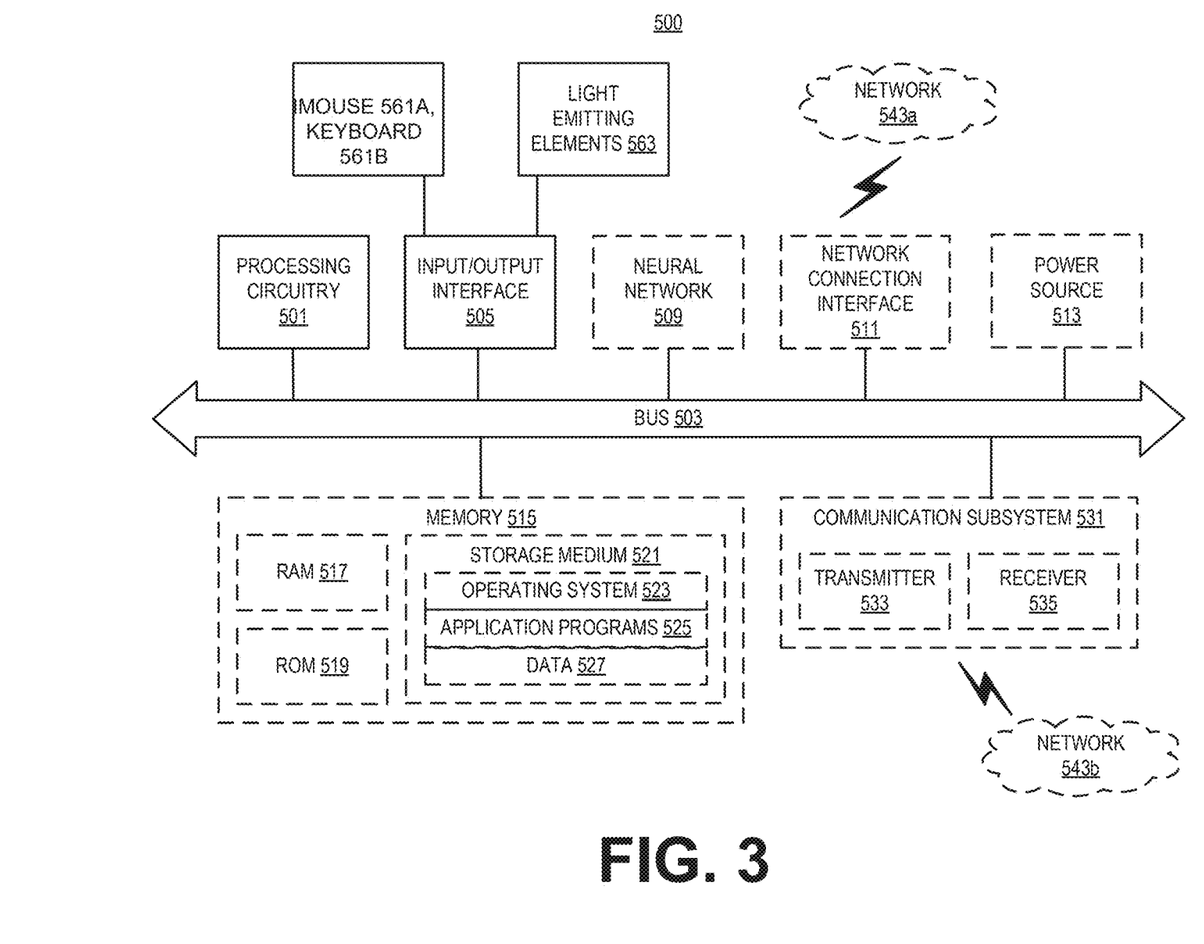
FIG. 3 illustrates another embodiment of an electronic device in accordance with various aspects as described herein.

FIG. 3 illustrates another embodiment of an electronic device 500 in accordance with various aspects as described herein. In FIG. 3, device 500 includes processing circuitry 501 that is operatively coupled to input/output interface 505, neural network circuit 509, network connection interface 511, memory 515 including random access memory (RAM) 517, read-only memory (ROM) 519, and a storage medium 521 or the like, communication subsystem 531, power source 513, and/or any other component, or any combination thereof. Storage medium 521 includes operating system 523, application program 525, and data 527. In other embodiments, storage medium 521 may include other similar types of information. Certain devices may utilize the components shown in FIG. 3, or a subset of the components. The level of integration between the components may vary from one device to another device. Further, certain devices may contain multiple instances of a component, such as multiple processors, memories, neural networks, network connection interfaces, transceivers, etc.

In FIG. 3, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. The device 500 may be configured to use an output device via input/output interface 505. An output device may use the same type of interface port as an input device. For example, a USB port may be used to provide input to and output from the device 500. The output device may be a peripheral device, such as, one or more of: a speaker, a sound card, a video card, a display, a monitor, a printer, an actuator, an emitter, a smartcard, a light emitting element 563, another output device, or any combination thereof. For example, the output device may be a set of light emitting elements 563, such as multiple light-emitting diodes (LEDs) while also including a display screen/monitor as discussed in this specification. The device 500 may be configured to use an input device via input/output interface 505 to allow a user to capture or input information into the device 500. The input device may include a touch-sensitive or presence-sensitive display screen, an image sensor (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, an infrared sensor, a proximity sensor, another like sensor, or any combination thereof. For example, the input device may be mouse 561A and a keyboard 561B. However, other input devices may be used, such as a PIN pad, a touch screen display, and/or a microphone, with or without the keyboard and mouse combination.

In FIG. 3, the neural network 509 may be configured to learn to perform tasks by considering examples. The network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as bar code decoder, a widget or gadget engine or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500 to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

In FIG. 3, the processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of the communication subsystem 531 may include data communication, voice communication, multimedia communication, short-range communications such as Bluetooth, near-field communication (NFC), location-based communication such as the use of the global positioning system (GPS) to determine a location, another like communication function, or any combination thereof. For example, the communication subsystem 531 may include cellular communication, Wi-Fi communication, Bluetooth communication, and GPS communication. For example, a payment car may be slid/inserted at a point of sale, or a mobile device (or card) with NFC may be used to tap for payment. The network 543*b* may encompass wired and/or wireless networks such as a local-area network (LAN), a wide-area network (WAN), a computer network, a wireless network, a telecommunications network, another like network or any combination thereof. For example, the network 543*b* may be a cellular network, a Wi-Fi network, and/or a near-field network. The power source 513 may be configured to provide alternating current (AC) or direct current (DC) power to components of the device 500.

The features, benefits and/or functions described herein may be implemented in one of the components of the device 500 or partitioned across multiple components of the device 500. Further, the features, benefits, and/or functions described herein may be implemented in any combination of hardware, software or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 4:
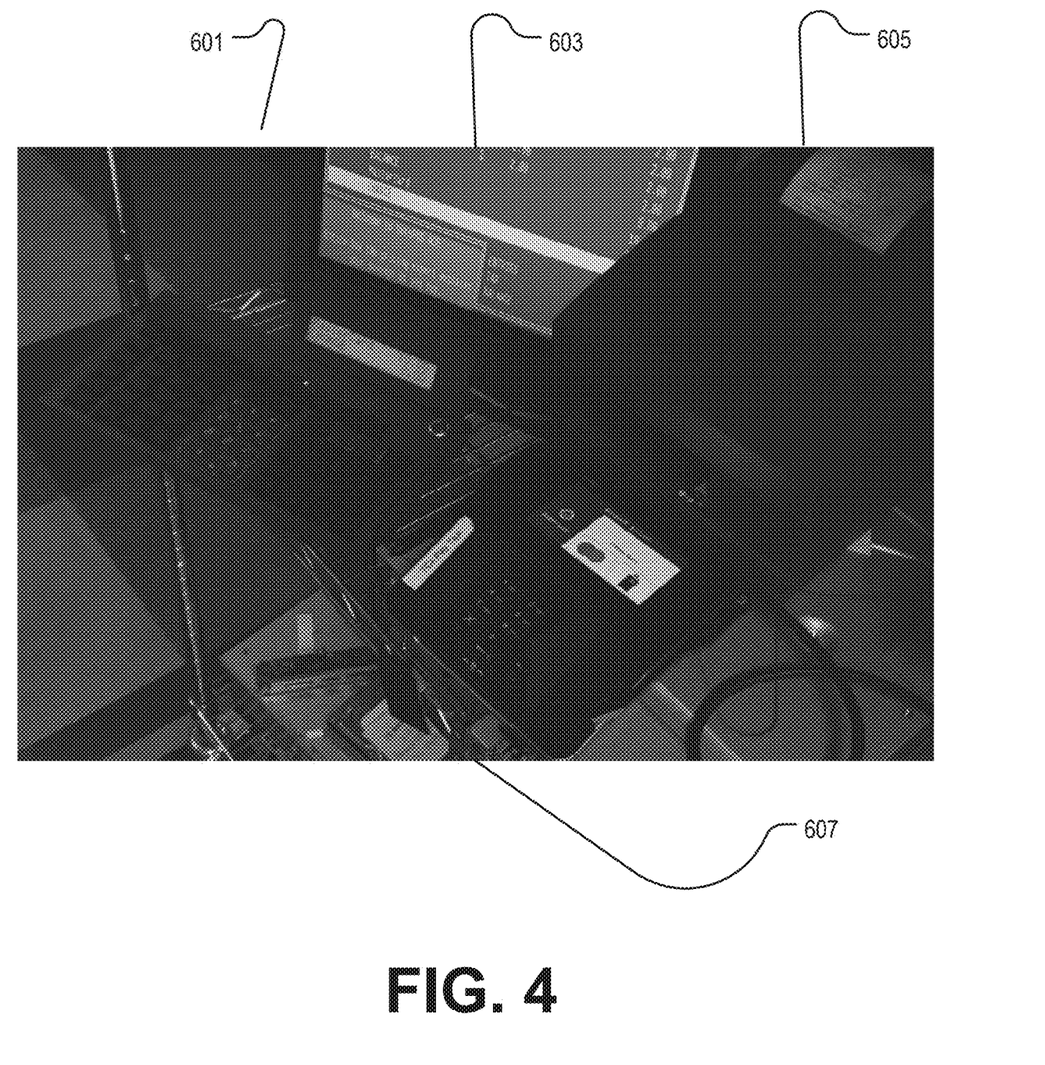
FIG. 4 illustrates a screenshot of a video related to an electronic terminal, according to an embodiment of the present disclosure.

FIG. 4 illustrates a screenshot of a video related to an electronic terminal. In one example, the screenshot of FIG. 4 shows a peripheral device (keyboard 601), a monitor/display screen 603, a receipt printer 605 and a PIN pad 607. The monitor/display screen 603 may be a touch screen display screen. As discussed above, the video related to the electronic terminal may include one or more of the items 601, 603, 605 and/or 607. For example, the video may include the display screen 603 as a touch pad display screen.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of the present disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include", and its various forms are intended to mean including but not limited to. References to "one embodiment," "an embodiment," "example embodiment," "various embodiments," and other like terms indicate that the embodiments of the disclosed technology so described may include a function, feature, structure, or characteristic, but not every embodiment necessarily includes the function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
causing, by a processing circuitry, a display device to play a video that shows an electronic device of a point of sale (POS) terminal; and
while the video is playing on the display device:
automatically detecting, by the processing circuitry, based on a visual analysis of the video, a captured event related to the electronic device of the POS terminal in the video;
capturing, by the processing circuitry, first time stamp information corresponding to a time point in the video that the captured event occurs in the video;
identifying, by the processing circuitry, a profile associated with the electronic device of the POS terminal;
predicting, by the processing circuitry, a future event associated with the captured event related to the electronic device of the POS terminal in the video based on an output from a neural network circuitry and trained by previous video sequences or video procedures that include annotations corresponding to a series of events associated with the electronic device of the POS terminal, wherein the annotations that are configured to train the neural network include event types of the profile associated with the electronic device of the POS terminal, with at least one of the previous video sequences being applied to train the neural network circuitry having imagery associated with a same procedure or event sequence type as the video that is playing;

responsive to detecting the predicted future event based on the visual analysis of the video, capturing, by the processing circuitry, second time stamp information corresponding to a time point in the video that the predicted future event is detected to have occurred in the video; and outputting, by the processing circuitry, information related to the predicted future event, and the captured second time stamp information to a file.

2. The method of claim 1, further comprising:
causing, by the processing circuitry, the display device to display the video playing with information regarding the predicted future event superimposed on the video that is playing.

3. The method of claim 2, wherein the displayed superimposed information includes an annotation regarding the predicted future event.

4. The method of claim 2, wherein the displayed superimposed information includes a list of annotations, including at least one annotation regarding the predicted future event.

5. The method of claim 4, wherein the displayed list of annotations includes toggleable check boxes to allow a user to indicate whether a predicted future event should be recorded.

6. The method of claim 1, further comprising:
calculating an amount of time between the captured event and the predicted future event after the predicted future event occurs; and
performing at least one of storing in the file and causing the display device to display the calculated amount of time.

7. The method of claim 1, further comprising:
identifying a profile associated with a type of the video, wherein the predicting of the future event associated with the captured event includes predicting a future event based on event sequence or event procedure information stored in the identified profile.

8. The method of claim 7, wherein the identifying of the profile associated with the type of the video includes automatically recognizing the type of the video based on object detection or audible recognition, or via manual entry by a user that indicates the type of the profile, from among a plurality of stored profile types.

9. The method of claim 1, wherein the automatic detecting of the predicted future event includes at least one of:
performing object detection and identification on at least a portion of the video; and
recognizing a sound in the video.

10. The method of claim 1, wherein the outputting, by the processing circuitry, includes outputting text corresponding to an annotation for the predicted future event with the outputting of the second time stamp information.

11. The method of claim 10, wherein the suggested annotation for the predicted future event corresponds to an event type of the predicted future event.

12. The method of claim 1, wherein the predicted future event includes:
displaying a predetermined message by a display device of the POS terminal.

13. The method of claim 1, wherein the trained neural network circuitry is also trained based on raw data that includes annotations of event types of profiles corresponding to different types of electronic devices of the POS terminal.

14. The method of claim 13, wherein the raw data used to train the neural network circuitry includes time stamp information with regards to timepoints of the event types of profiles.

15. A video analysis system, comprising:
a processing circuitry and a memory, the memory containing instructions executable by the processing circuitry that causes the processing circuitry to:
cause a display device to play a video that shows an electronic device of a point of sale (POS) terminal; and
while the video is playing on the display device:
automatically detect, based on a visual analysis of the video, a captured event related to the electronic device of the POS terminal in the video;
capture first time stamp information corresponding to a time point in the video that the captured event occurs in the video;
identify a profile associated with the electronic device of the POS terminal;
predict a future event associated with the captured event related to the electronic device of the POS terminal in the video based on an output from a neural network circuitry that has been trained by previous video sequences or video procedures that include annotations corresponding to a series of events associated with the electronic device of the POS terminal, wherein the annotations configured to train the neural network include event types of the profile associated with the electronic device of the POS terminal, with at least one of the previous video sequences being applied to train the neural network circuitry having imagery associated with a same procedure or event sequence type as the video that is playing;
responsive to detecting the predicted future event based on the visual analysis of the video, capture second time stamp information corresponding to a time point in the video that the predicted future event is detected to have occurred in the video; and
output information related to the predicted future event, and the captured second time stamp information to a file.

16. The video analysis system of claim 15, wherein the instructions further cause the processing circuitry to:
cause the display device to display the video playing with information regarding the predicted future event superimposed on the video that is playing.

17. The video analysis system of claim 15, wherein the instructions further cause the processing circuitry to:
identify a profile associated with a type of the video, wherein the predicting of the future event associated with the captured event includes predicting a future event based on event sequence or event procedure information stored in the identified profile.

18. A non-transitory computer readable medium comprising computer-executable instructions that, when executed by a processing circuitry, cause the processing circuitry to:
cause a display device to play a video that shows an electronic device of a point of sale (POS) terminal; and
while the video is playing on the display device:
automatically detect, based on a visual analysis of the video, a captured event related to the electronic device of the POS terminal in the video;
capture first time stamp information corresponding to a time point in the video that the captured event occurs in the video;
identify a profile associated with the electronic device of the POS terminal;

predict a future event associated with the captured event related to the electronic device of the POS terminal in the video based on an output from a neural network circuitry that has been trained by previous video sequences or video procedures that include annotations corresponding to a series of events associated with the electronic device of the POS terminal, wherein the annotations configured to train the neural network include event types of the profile associated with the electronic device of the POS terminal, with at least one of the previous video sequences being applied to train the neural network circuitry having imagery associated with a same procedure or event sequence type as the video that is playing;

responsive to detecting the predicted future event based on the visual analysis of the video, capture second time stamp information corresponding to a time point in the video that the predicted future event is detected to have occurred in the video; and output information related to the predicted future event, and the captured second time stamp information to a file.

19. The non-transitory computer readable medium of claim 18, wherein the computer-executable instructions are further configured to:

cause the display device to display the video playing with information regarding the predicted future event superimposed on the video that is playing.

20. The method of claim 1, wherein the predicted future event includes at least one of display of a predetermined message by a display device associated with the electronic device of the POS terminal, display of a certain color by a display indicator associated with the electronic device of the POS terminal, a certain action performed by a peripheral device associated with the electronic device of the POS terminal, or output of a certain sound by a sound device associated with the electronic device of the POS terminal.

21. The method of claim 1, wherein the information that is output to the file includes at least one of a text annotation describing the predicted future event, a classification label indicating an event type, a confidence score associated with the prediction, or a reference to the time interval between the captured event and the predicted future event.

\* \* \* \* \*